United States Patent
Jiang et al.

(10) Patent No.: US 12,335,163 B2
(45) Date of Patent: Jun. 17, 2025

(54) MANAGING A CONNECTION POOL FOR CLOUD-BASED APPLICATIONS ACCESSING DATABASES

(71) Applicant: International Business Machines Corporation, Armonk, NY (US)

(72) Inventors: Peng Hui Jiang, Beijing (CN); Biao Chai, Beijing (CN); Wei Wu, Beijing (CN); Xinpeng Liu, Austin, TX (US); Yue Wang, Beijing (CN); Liang Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/504,314

(22) Filed: Nov. 8, 2023

(65) Prior Publication Data

US 2025/0150409 A1 May 8, 2025

(51) Int. Cl.
*H04L 47/762* (2022.01)
*H04L 67/10* (2022.01)

(52) U.S. Cl.
CPC ............ *H04L 47/762* (2013.01); *H04L 67/10* (2013.01)

(58) Field of Classification Search
CPC .............................. H04L 47/762; H04L 67/10
See application file for complete search history.

(56) References Cited

U.S. PATENT DOCUMENTS

| | | | |
|---|---|---|---|
| 10,536,545 B2 | 1/2020 | Divilly et al. | |
| 11,151,150 B2 | 10/2021 | Obembe et al. | |
| 11,182,496 B1 | 11/2021 | Walters et al. | |
| 11,243,970 B2 | 2/2022 | D'Amore et al. | |
| 2007/0136311 A1* | 6/2007 | Kasten | H04L 67/14 |
| 2009/0276771 A1* | 11/2009 | Nickolov | H04L 67/1021 718/1 |
| 2015/0134839 A1 | 5/2015 | Kasten et al. | |
| 2018/0046730 A1 | 2/2018 | De Lavarene et al. | |

(Continued)

FOREIGN PATENT DOCUMENTS

| | | |
|---|---|---|
| CN | 106250500 A | 12/2016 |
| CN | 111324644 A | 6/2020 |

(Continued)

OTHER PUBLICATIONS

Amazon, "Amazon RDS Proxy," URL: https://aws.amazon.com/rds/proxy/, (Retrieved Oct. 2, 2023), 8 pages.

(Continued)

*Primary Examiner* — Suraj M Joshi
(74) *Attorney, Agent, or Firm* — CANTOR COLBURN LLP; Teddi Maranzano

(57) ABSTRACT

Methods for managing a connection pool for cloud-based applications accessing databases are provided. Aspects include establishing a plurality of connections to one or more databases, receiving connection requests from a plurality of cloud-based applications to access the one or more databases, and allocating the connection requests to among the plurality of connections, where the allocation is determined based at least in part on one or more connection pool parameters. Aspects also include monitoring a usage of the plurality of connections by the plurality of applications and updating the one or more connection pool parameters based on an analysis of the usage of the plurality of connections by the plurality of applications.

17 Claims, 4 Drawing Sheets

(56) References Cited

U.S. PATENT DOCUMENTS

2019/0075170 A1  3/2019 Colrain et al.
2019/0339688 A1* 11/2019 Cella .................. H04L 1/18
2021/0081427 A1*  3/2021 Obembe ............. G06F 16/252

FOREIGN PATENT DOCUMENTS

| CN | 112069237 A  | 12/2020 |
| CN | 114265830 A  | 4/2022  |
| EP | 3494474 B1   | 10/2022 |
| JP | 6967534 B2   | 11/2021 |
| WO | 2017213803 A1 | 12/2017 |

OTHER PUBLICATIONS

Anonymous, "A Method for Intelligently Managing a Database Connections Pool in a Multi-Tenant Microservice System," Aug. 2, 2022, An IP.com Prior Art Database Technical Disclosure, IP.com No. IPCOM000270716D, 4 pages.

Bransberg, "Advanced Connection Pooling for Amazon RDS and Redshift," URL: https://blog.heimdalldata.com/advanced-connection-pooling-for-amazon-rds-and-redshift/m, (Retrieved Oct. 2, 2023), 8 pages.

Mihalcea, "FlexyPool, reactive connection pooling," URL: https://vladmihalcea.com/flexy-pool-reactive-connection-pooling/, (Retrieved Oct. 9, 2023), 11 pages.

International Searching Authority, "Notification of Transmittal of the International Search Report and the Written Opinion of the International Searching Authority, or Declaration," Patent Cooperation Treaty, Nov. 27, 2024, 18 pages, International Application No. PCT/EP2024/071439.

* cited by examiner

MANAGING A CONNECTION POOL FOR CLOUD-BASED APPLICATIONS ACCESSING DATABASES

BACKGROUND

The present disclosure generally relates to managing access to a database, and more specifically, to methods and systems for methods for managing a connection pool for cloud-based applications accessing databases.

Applications frequently connect to and obtain information from various databases. Traditionally, an application establishes a connection to a database, transmits queries to the database, receives the desired data, and then closes the connection to the database. This opening and closing of database connections for each transaction by an application represent a substantial overhead that is required for the application to obtain data from a database.

In order to reduce the overhead of opening and closing connections between an application and a database, a connection proxy on an application server is used to maintain one or more database connections that are used by the application as needed. In general, by using a connection proxy, an application can maintain a high level of performance and scalability even under heavy loads, because it eliminates the overhead of opening and closing database connections for each transaction.

In some cases, where multiple applications on the same application server use the same database with similar connection requirements, a connection proxy may be shared by the multiple applications. However, if applications have different database requirements or usage patterns, it is currently necessary to maintain separate connection proxies to avoid resource contention and optimize performance. Additionally, sharing a connection proxy between multiple applications can increase the risk of connection conflicts, where multiple applications try to access the same connection at the same time.

SUMMARY

Embodiments of the present disclosure are directed to computer-implemented methods for managing a connection pool for cloud-based applications accessing databases. According to an aspect, a computer-implemented method includes establishing a plurality of connections to one or more databases, receiving connection requests from a plurality of cloud-based applications to access the one or more databases, and allocating the connection requests to among the plurality of connections, where the allocation is determined based at least in part on one or more connection pool parameters. The method also includes monitoring a usage of the plurality of connections by the plurality of applications and updating the one or more connection pool parameters based on an analysis of the usage of the plurality of connections by the plurality of applications.

Embodiments also include computer systems and computer program products for managing a connection pool for cloud-based applications accessing databases.

Additional technical features and benefits are realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the present disclosure are apparent from the following detailed description taken in conjunction with the accompanying drawings in which:

DETAILED DESCRIPTION

Figure 1:
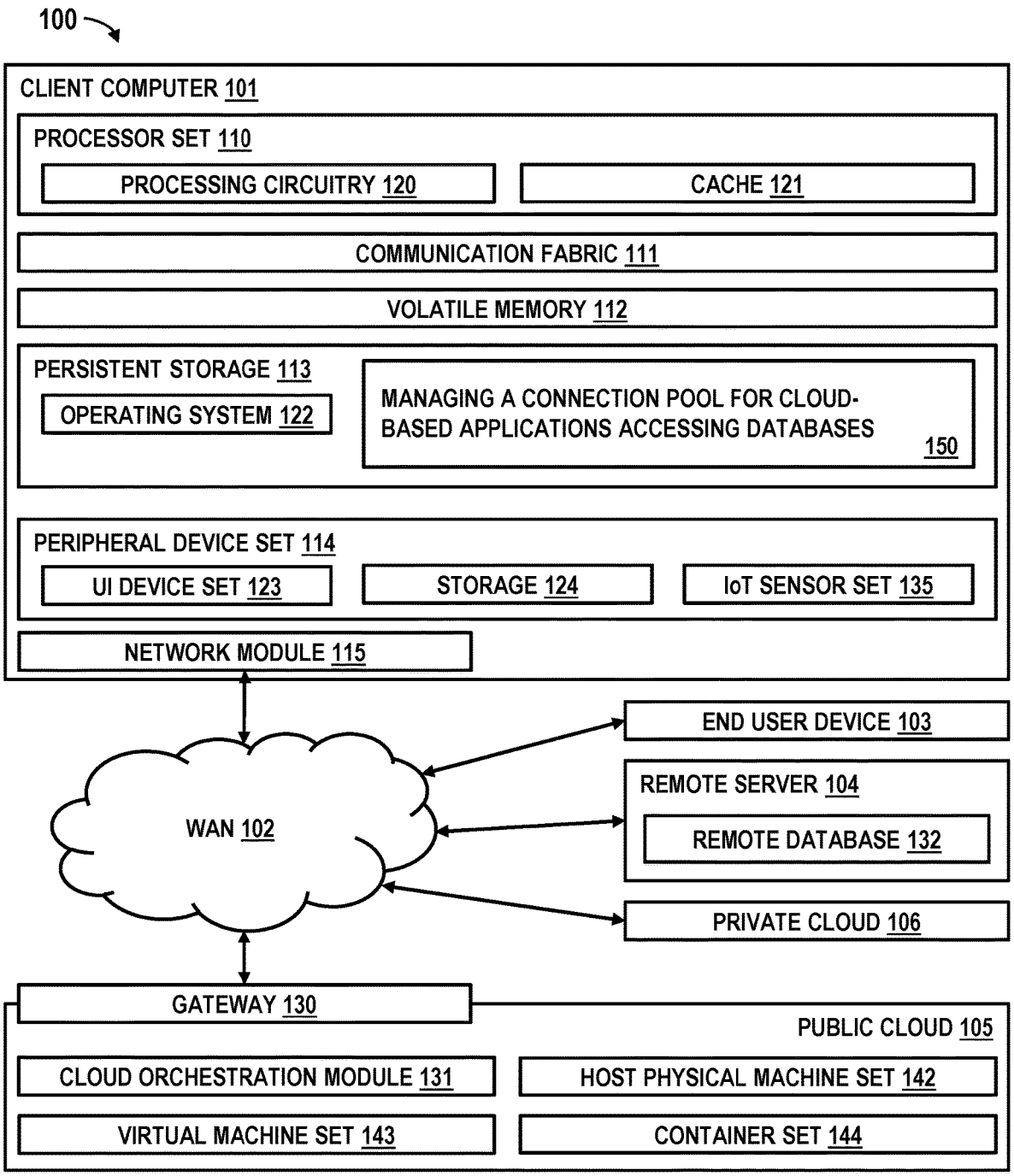
FIG. 1 depicts a block diagram of an example computer system for use in conjunction with one or more embodiments of the present disclosure.

Embodiments of the present disclosure are directed to computer-implemented methods for managing a connection pool for cloud-based applications accessing databases. According to an aspect, a computer-implemented method includes establishing a plurality of connections to one or more databases, receiving connection requests from a plurality of cloud-based applications to access the one or more databases, and allocating the connection requests to among the plurality of connections, where the allocation is determined based at least in part on one or more connection pool parameters. The method also includes monitoring a usage of the plurality of connections by the plurality of applications and updating the one or more connection pool parameters based on an analysis of the usage of the plurality of connections by the plurality of applications.

One technical benefit of this method for managing a connection pool for cloud-based applications accessing databases is that cloud-based applications will be able to more quickly access the database by not having to open a new database connection. In addition, the efficiency of the computing system is improved by reducing the number of time that connections to a database are opened and closed. A further technical benefit includes improving the operation of the computing system by modifying the allocations of the database connections based on the monitored usage of the plurality of connections by the plurality of cloud-based applications.

Additionally, or alternatively, in embodiments of the present invention monitoring the usage of the plurality of connections by the plurality of cloud-based applications includes storing connection parameters for the plurality of connections to one or more databases in a connection activity knowledge database. A technical benefit of storing the connection parameters for the plurality of connections to one or more databases in a connection activity knowledge database is that the connection activity knowledge database will include connection parameters for the plurality of connections to one or more databases connections that can be used to improve the operation of the computing system by determining when to open and close database connections.

Additionally, or alternatively, in embodiments of the present invention monitoring the usage of the plurality of connections by the plurality of cloud-based applications includes storing data regarding the received connection requests from each of the plurality of cloud-based applications in the connection activity knowledge database. A technical benefit of storing the data regarding the received connection requests from each of the plurality of cloud-based applications in the connection activity knowledge database is that the connection activity knowledge database will include historical connection requests received for each of the plurality of connections that can be used to improve the operation of the computing system by modifying the allocations of the database connections.

Additionally, or alternatively, in embodiments of the present invention the connection pool parameters include load balancing data that defines a maximum allocation for each of the plurality of cloud-based applications corresponding to each of the plurality of connections. A technical benefit of the connection pool parameters include load balancing data that defines a maximum allocation for each of the plurality of cloud-based applications corresponding to each of the plurality of connections is that the connection pool parameters be used to improve the operation of the computing system by properly allocating the database connections among the plurality of cloud-based applications.

Additionally, or alternatively, in embodiments of the present invention the connection pool parameters include a number of the plurality of connections to each of the one or more databases and connection time out settings for each of the plurality of connections to each of the one or more databases. A technical benefit of the connection pool parameters include a number of the plurality of connections to each of the one or more databases and connection time out settings for each of the plurality of connections to each of the one or more databases is an improved the operation of the computing system by determining when to open and close database connections.

Additionally, or alternatively, in embodiments of the present invention updating includes the one or more connection pool parameters includes one or more of increasing the number of the plurality of connections to the one or more databases, decreasing the number of the plurality of connections to the one or more databases, and modifying the load balancing data for one or more of the plurality of connections. A technical benefit of updating includes the one or more connection pool parameters by increasing or decreasing the number of the plurality of connections to the one or more databases is an improved efficiency and throughput of the computing system by maintaining the proper number of open database connections to serve the plurality of cloud-based applications in a timely manner.

Embodiments also include computer systems and computer program products for managing a connection pool for cloud-based applications accessing databases.

As discussed above, when applications that have different database usage requirements or usage patterns, it is currently necessary to maintain a separate connection pools to avoid resource contention and optimize performance. Additionally, as applications move onto the cloud, there is no longer an application server that includes a central connection pool component. Instead, the connection requests from the applications are sent directly to the database.

In exemplary embodiments, a connection pool for cloud-based applications accessing databases is provided. In exemplary embodiments, the connection pool is configured to receive database connection requests from a plurality of cloud-based applications and to maintain one or more connections with one or more databases. The connection pool is configured to allocate the one or more connections with one or more databases among the plurality of cloud-based applications based on one or more connection pool parameters.

In exemplary embodiments, the connection pool is configured to monitor and analyze the database access requests received from each of the cloud-based applications and the utilization of the one or more connections with one or more databases. Based on the analysis of this data, the connection pool is configured to create and modify the connection pool parameters. In exemplary embodiments, the connection pool parameters include a number of the plurality of connections to each of the one or more databases and connection time out settings for each of the plurality of connections to each of the one or more databases. In addition, the connection pool parameters include load balancing data that defines a maximum allocation for each of the plurality of cloud-based applications corresponding to each of the plurality of connections. As the usage patterns of the cloud-based applications, the connection pool is configured to modify the connection pool parameters to avoid resource contention, optimize the utilization of the one or more connections with one or more databases, and to optimize the database access performance provided to the plurality of cloud-based applications.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as managing a connection pool for cloud-based applications accessing databases (block 150). In addition to block 150, computing environment 100 includes, for example, computer 101, wide area network (WAN) 102, end user device (EUD) 103, remote server 104, public Cloud 105, and private Cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 132. Public Cloud 105 includes gateway 130, Cloud orchestration module 131, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 132. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a Cloud, even though it is not shown in a Cloud in FIG. 1. On the other hand, computer 101 is not required to be in a Cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers.

IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 132 of remote server 104.

PUBLIC CLOUD 105 is any computer system available for use by multiple entities that provides on-demand availability of computer system resources and/or other computer capabilities, especially data storage (Cloud storage) and computing power, without direct active management by the user. Cloud computing typically leverages sharing of resources to achieve coherence and economies of scale. The direct and active management of the computing resources of public Cloud 105 is performed by the computer hardware and/or software of Cloud orchestration module 131. The computing resources provided by public Cloud 105 are typically implemented by virtual computing environments that run on various computers making up the computers of host physical machine set 142, which is the universe of physical computers in and/or available to public Cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 131 manages the transfer and storage of images, deploys new instantiations of VCEs and manages active instantiations of VCE deployments. Gateway 130 is the collection of computer software, hardware, and firmware that allows public Cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public Cloud 105, except that the computing resources are only available for use by a single enterprise. While private Cloud 106 is depicted as being in communication with WAN 102, in other embodiments a private Cloud may be disconnected from the internet entirely and only accessible through a local/private network. A hybrid Cloud is a composition of multiple Clouds of different types (for example, private, community or public Cloud types), often respectively implemented by different vendors. Each of the multiple Clouds remains a separate and discrete entity, but the larger hybrid Cloud architecture is bound together by standardized or proprietary technology that enables orchestration, management, and/or data/application portability between the multiple constituent Clouds. In this embodiment, public Cloud 105 and private Cloud 106 are both part of a larger hybrid Cloud.

One or more embodiments described herein can utilize machine learning techniques to perform prediction and or classification tasks, for example. In one or more embodiments, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input.

A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Figure 2:
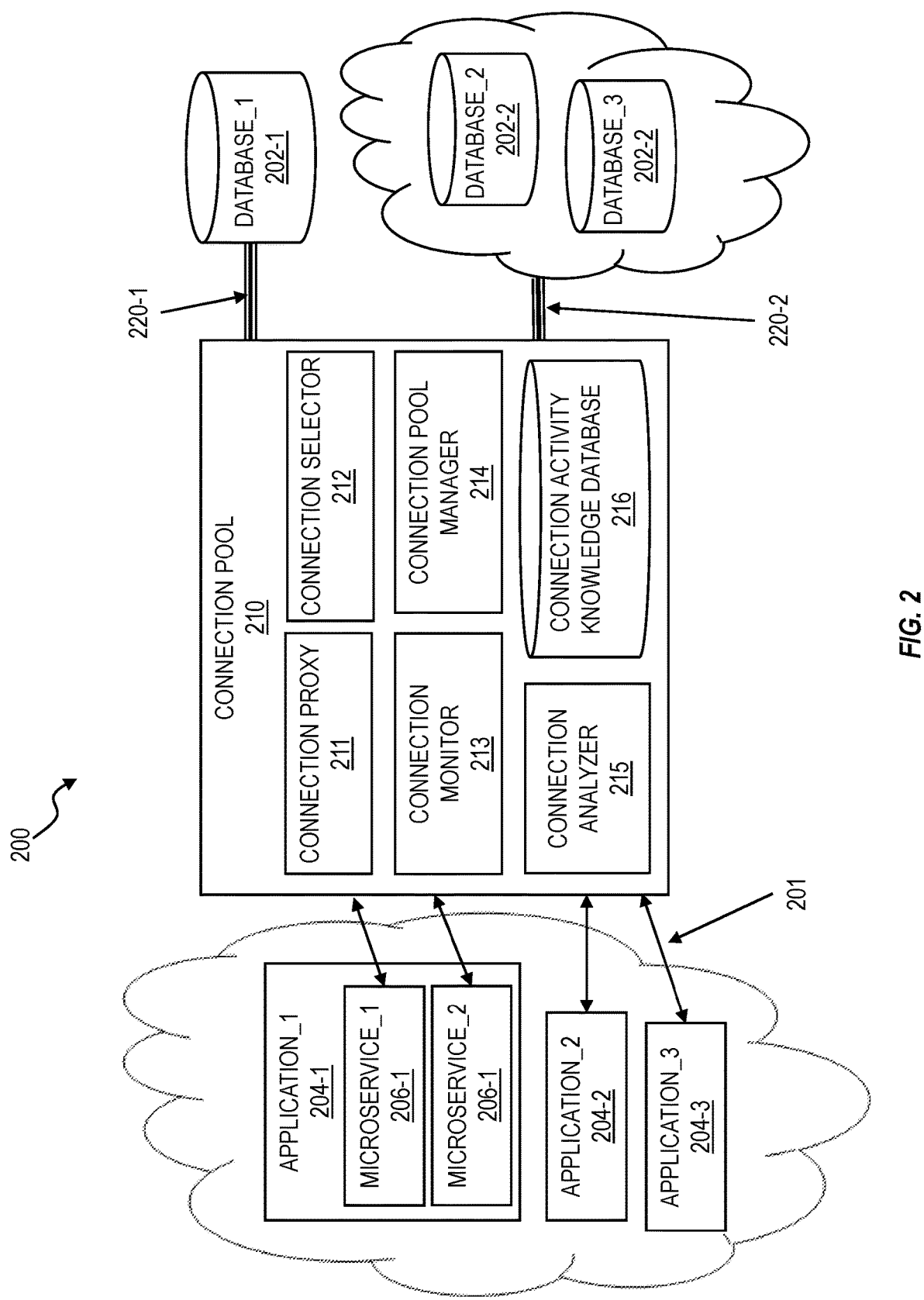
FIG. 2 depicts a block diagram of a system for managing a connection pool for cloud-based applications accessing databases in accordance with one or more embodiments of the present disclosure.

Referring now to FIG. 2, a block diagram of a system 200 for managing a connection pool for cloud-based applications accessing databases in accordance with one or more embodiments of the present disclosure is shown. In one embodiment, the connection pool 210 may be embodied in a computer 101, as shown in FIG. 1. In another embodiment, the connection pool 210 may be embodied in a virtual machine that is hosted in a public cloud 106 or a private cloud 105, as shown in FIG. 1.

As illustrated, the system 200 includes a connection pool 210 that is configured to receive database access requests 201 from a plurality of cloud-based applications 204. The connection pool 210 is also configured to maintain one or more connections 220 with one or more databases 202. As illustrated, the databases 202 can include databases 202-2, 202-3 that are cloud-based and databases 202-1 that are not cloud-based.

In exemplary embodiments, the connection pool 210 includes a connection proxy 211, a connection selector 212, a connection monitor 213, a connection pool manager 214, a connection analyzer 215, and a connection activity knowledge database 216. Although illustrated as separate modules, one or more of the connection proxy 211, the connection selector 212, the connection monitor 213, the connection pool manager 214, and the connection analyzer 215 may be combined in various embodiments.

In exemplary embodiments, the connection monitor 213 is configured to monitor connection requests 201 that are received from the cloud-based applications 204, or microservices 206 associated with one of the cloud-based applications 204. In exemplary embodiments, a connection request for accessing a database can include an address of a server hosting the database, the name of the database, a username and password to be used to connect to the database, and the like. The connection request 201 also includes information identifying the source of the connection request, i.e., the name and/or location of the cloud-based applications 204 or microservices 206. The connection monitor 213 is also configured to store the data collected from the connection requests 201, and the responses provided by the databases 202, in a connection activity knowledge database 216.

In exemplary embodiments, the connection monitor 213 is also configured to monitor the connections 220 with the one or more databases. For example, the connection monitor 213 may monitor the usage of the connections 220 and can keep track of the status of the each of the connections 220, where the status indicates whether the connection 220 is being used, and if so, the level of utilization of the connection 220. In exemplary embodiments, the connection monitor 213 is also configured to monitor the connections 220 with the one or more databases for errors or timeout. For example, the connection monitor 213 includes a connection health threshold configuration for each connection 220 that specifies a maximum number of errors or timeouts before a connection is considered unhealthy. The connection monitor 213 is also configured to capture and store timestamps, application IDs, connection durations, query counts, error rates, and the like for each connection request in the activity knowledge database 216. In exemplary embodiments, all of the data monitored by the connection monitor 213 is stored in the connection activity knowledge database 216.

In exemplary embodiments, the connection analyzer 215 is configured to analyze the connection requests 201 received from multiple cloud-based applications 204 and the responses to the requests 201 from databases 202. In exemplary embodiments, the connection analyzer 215 obtains data regarding the requests 201 and associated response data from the connection activity knowledge database 216. In exemplary embodiments, the connection analyzer 215 is configured to preprocess the data obtained from the connection activity knowledge database 216. The preprocessing includes cleaning the data, addressing any missing values in the data, and ensuring data consistency.

Once the connection analyzer 215 has preprocessed the data, the connection analyzer 215 configured to aggregate the data, which includes grouping the data based on relevant dimensions, such as the source cloud-based application, time intervals, or usage categories, such as, group connections by hour or by specific types of queries. Based on the grouped data, the connection analyzer 215 is configured to calculate one or more metrics for each of the data groups, the metrices can include the average connection duration, the average queries executed per connection, peak usage times, error rates, and the distribution of connection durations. In exemplary embodiments, the metrics are periodically calculated and the connection analyzer 215 is configured to identify patterns and/or trends in the calculated metrics. For example, the connection analyzer 215 is configured to identify trends, anomalies, and correlations between different metrics. In one example, certain tenants consistently use connections for longer durations during specific times of the day. In exemplary embodiments, the connection analyzer 215 is configured to create and adjust one or more connection pool parameters based on the identified patterns and trends. The one or more connection pool parameters are a set of rules that are used to allocate the incoming connection request among the existing database connections. In addition, the one or more connection pool parameters may specify connection timeout thresholds for each cloud-based application based on the connection usage profile of the cloud-based application. In exemplary embodiments, the one or more connection pool parameters may specify conditions that are used to determine when connections to the databases should be added, restarted, merged, or closed.

In exemplary embodiments, the connection proxy 211 is configured to receive connection requests. In one embodiment, the connection proxy 211 includes an application programing interface (API) that accepts incoming database connection requests 201 from cloud-based applications 204. The connection proxy 211 may be configured to transmit a copy of the connection request data to the connection analyzer 215 and to a connection selector 212. In exemplary embodiments, the connection selector 212 is configured to assign the connection request 201 to one or more connections 220. The connection selector 212 is configured to obtain the utilization of each of the connections 220 from the connection monitor 213 and to assign the connection request 201 to one or more connections 220 based at least in part on the utilization and the one or more connection pool parameters. The connection pool parameters may include a connection weight configuration (e.g. prioritize certain connections based on performance or capacity and/or a load balancing algorithm (e.g. round-robin, weighted round-robin, or dynamic based on server load) that are used by the connection selector 212 to assign the connection request 201 to one or more connections 220.

In exemplary embodiments, the connection pool manager 214 is configured to manage the connections 220 based on data obtained from the connection monitor 213 and the one or more connection pool parameters. In one embodiment, the connection pool manager 214 is configured to provide automatic detection and configuration of database endpoints, as well as features like connection validation and connection timeout management. The connection pool manager 214 is configured to create new connections 220 and the split/merge existing connections 220 based on the utilization data of the existing connections obtained from the connection analyzer 215. In addition, the connection pool manager 214 is configured to create and modify the connection allocation algorithm (e.g. first-in-first-out, least recently used, or round-robin) that is used by the connection selector 212 to allocate incoming requests 201. In exemplary embodiments, the connection pool manager 214 is configured to create and modify the connection allocation algorithm based on data obtained from the connection analyzer 215.

In exemplary embodiments, the connection pool manager 214 implements a connection pool queue for each of the connections 220, which are used to manage the allocation of each connection 220 among the cloud-based applications 204. In one embodiment, the connection pool queue for a connection 220 includes a statement pool queue that is used to queue queries to be sent to the databases and a result pool queue that is used to queue results received from the databases. The connection pool manager 214 specifies the size and structure (e.g. queue, stack, or map) of the connection pool queue for each connection and a synchronization mechanism for each connection pool queue (e.g.

Figure 3:
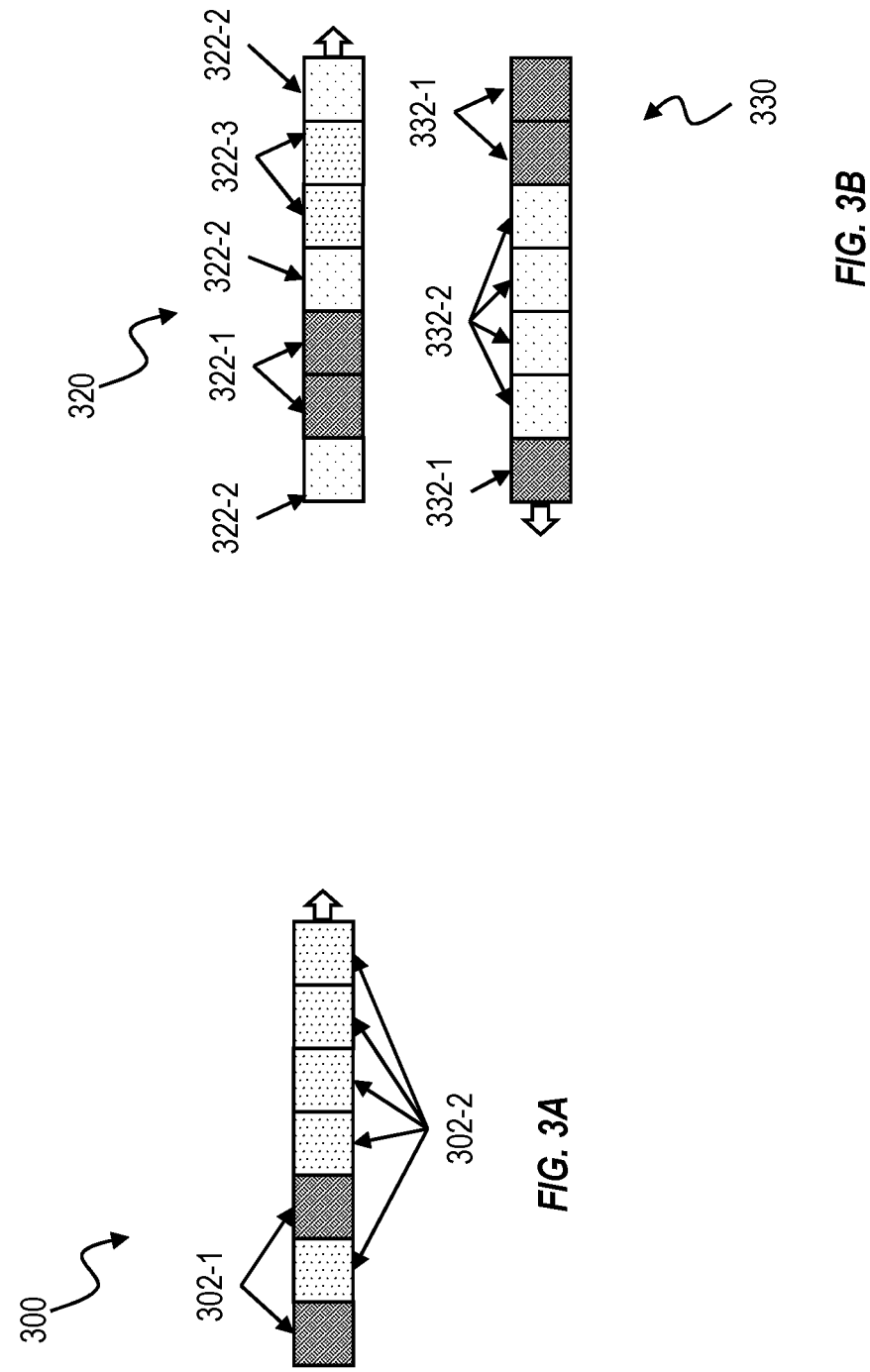
FIG. 3A depicts a connection pool queue in accordance with an embodiment of the present disclosure.
FIG. 3B depicts a statement pool queue and a result pool queue in accordance with an embodiment of the present disclosure.

Referring now to FIG. 3A, a connection pool queue 300 in accordance with an embodiment of the present disclosure is shown. As illustrated, the connection pool queue 300 includes a plurality of elements 302-1 and 302-2, which are referred to collectively herein as elements 302. In one embodiment, the connection pool queue 300 is created and managed by a connection pool manager. In exemplary embodiments, the connection pool queue 300 corresponds to a connection between the connection pool and a database. The elements 302 of the connection pool queue 300 are allocated by the connection pool manager to various cloud-based applications. For example, elements 302-1 are allocated to a first cloud-based application and elements 302-2 are allocated to a second cloud-based application. As illustrated, the second cloud-based application is allocated more than twice the number of elements 302-2 that the first cloud-based application.

Referring now to FIG. 3B, a statement pool queue 320 and a result pool queue 330 in accordance with an embodiment of the present disclosure is shown. As illustrated, the statement pool queue 320 includes a plurality of elements 322-1, 322-2, and 322-3, which are referred to collectively herein as elements 322. Likewise, the result pool queue 330 includes a plurality of elements 332-1 and 332-2, which are referred to collectively herein as elements 322. In one embodiment, the statement pool queue 320 and the result pool queue 330 are created and managed by a connection pool manager. In exemplary embodiments, the statement pool queue 320 and the result pool queue 330 both correspond to a connection between the connection pool and a database. In exemplary embodiments, each element 322 of the statement pool queue 320 is allocated by the connection pool manager to a combination of a cloud-based application and a target database. Likewise, each element 332 of the result pool queue 330 is allocated by the connection pool manager to a combination of a cloud-based application and a target database.

Figure 4:
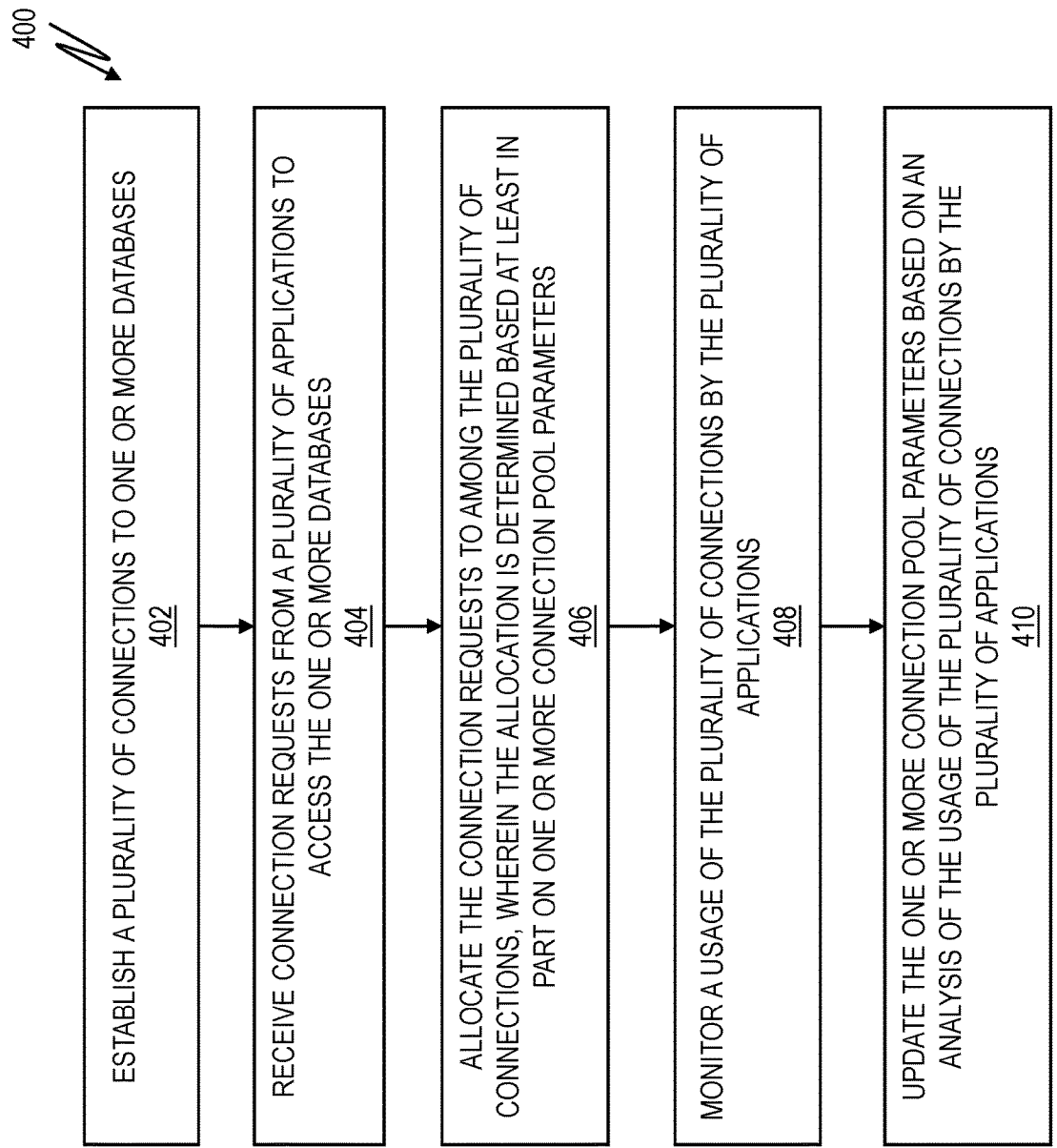
FIG. 4 depicts a flowchart of a method for managing a connection pool for cloud-based applications accessing databases in accordance with one or more embodiments of the present disclosure.

Referring now to FIG. 4, a flowchart of a method for managing a connection pool for cloud-based applications accessing databases in accordance with one or more embodiments of the present disclosure is shown. In one embodiment, the method 400 is performed by a connection pool 210 such as the one shown in FIG. 2. At block 402, the method 400 establishing a plurality of connections to one or more databases. Next, as shown at block 404, the method 400 includes receiving connection requests from a plurality of cloud-based applications to access the one or more databases.

The method 400 also includes allocating the connection requests to among the plurality of connections, where the allocation is determined based at least in part on one or more connection pool parameters, as shown at block 406. In exemplary embodiments, the connection pool parameters are created and updated based on an analysis of the connections requests received from the plurality of cloud-based applications and the utilization of the connections to the one or more databases. In one embodiment, the connection pool parameters include a number of the plurality of connections to each of the one or more databases and connection time out settings for each of the plurality of connections to each of the one or more databases. The connection pool parameters can also include load balancing data that defines a maximum allocation for each of the plurality of cloud-based applications corresponding to each of the plurality of connections.

As shown at block 408, the method 400 includes monitoring a usage of the plurality of connections by the plurality of applications. In one embodiment, monitoring the usage of the plurality of connections by the plurality of cloud-based applications includes storing connection parameters for the plurality of connections to one or more databases in a connection activity knowledge database. In exemplary embodiments, monitoring the usage of the plurality of connections by the plurality of cloud-based applications includes storing data regarding the received connection requests from each of the plurality of cloud-based applications in the connection activity knowledge database.

As shown at block 410, the method 400 includes updating the one or more connection pool parameters based on an analysis of the usage of the plurality of connections by the plurality of applications. In one embodiment, updating includes the one or more connection pool parameters includes increasing the number of the plurality of connections to the one or more databases. In another embodiment, updating includes the one or more connection pool parameters includes decreasing the number of the plurality of connections to the one or more databases. In another embodiment, updating includes the one or more connection pool parameters includes modifying the load balancing data for one or more of the plurality of connections.

In exemplary embodiments, one of the plurality of connections is utilized by two or more of the plurality of cloud-based applications and a connection pool queue is configured to manage a usage of the one of the plurality of connections by each of the two or more of the plurality of applications. In exemplary embodiments, the portion of the connection pool queue that is assigned to each of the two or more of the plurality of cloud-based applications is determined based on the connection pool parameters. In one example, two applications (application A and application B) both utilize a connection to a first database and the connection pool parameters specify that application A should be allocated twice the bandwidth of application B. In this example, the connection pool queue is configured to allocate two out of every three elements of the queue for application A and one out of every three elements of the queue for application B. In exemplary embodiments, the connection pool queue includes a statement pool queue that is used to queue queries to be sent to the databases and a result pool queue that is used to queue results received from the databases.

In certain embodiments, the connection pool queue is dynamically managed based on the real-time demand from cloud-based applications. For instance, if there is a sudden spike in usage from Application A, the connection pool parameters can be adjusted dynamically to ensure that Application A receives the required bandwidth while maintaining a fair distribution of resources among various applications. This dynamic adjustment enhances the system's efficiency and responsiveness to changing workloads. Furthermore, the connection pool queue operates seamlessly with various types of databases, adapting to different query complexities and response times. This adaptability ensures optimal performance across a wide range of cloud-based applications and databases, promoting a smooth and efficient user experience.

Various embodiments are described herein with reference to the related drawings. Alternative embodiments can be devised without departing from the scope of the present disclosure. Various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the present disclosure may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/ connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for managing a connection pool for cloud-based applications accessing databases, the method comprising:
    establishing a plurality of connections to one or more databases;
    receiving connection requests from a plurality of cloud-based applications to access a database of the one or more databases, wherein each connection request includes an address of a server hosting the database of the one or more databases, the name of the database, a username and password to be used to connect to the database, and an identification of a source of the connection request;
    allocating the connection requests to among the plurality of connections, wherein the allocation is determined based at least in part on one or more connection pool parameters;
    monitoring a usage of the plurality of connections by the plurality of cloud-based applications; and
    updating the one or more connection pool parameters based on an analysis of the usage of the plurality of connections by the plurality of cloud-based applications,
    wherein the connection pool parameters include a number of the plurality of connections to each of the one or more databases, connection time out settings for each of the plurality of connections to each of the one or more databases, and a connection health threshold configuration for each of the plurality of connections that specifies a maximum number of error or timeouts for a connection to be considered unhealthy, and
    wherein the plurality of connections to each of the one or more databases are established prior to receiving connection requests for the one or more databases.

2. The computer-implemented method of claim 1, wherein monitoring the usage of the plurality of connections by the plurality of cloud-based applications includes storing connection parameters for the plurality of connections to one or more databases in a connection activity knowledge database.

3. The computer-implemented method of claim 2, wherein monitoring the usage of the plurality of connections by the plurality of cloud-based applications includes storing data regarding the received connection requests from each of the plurality of cloud-based applications in the connection activity knowledge database.

4. The computer-implemented method of claim 1, wherein the connection pool parameters include load balancing data that defines a maximum allocation for each of the plurality of cloud-based applications corresponding to each of the plurality of connections.

5. The computer-implemented method of claim 4, wherein updating includes the one or more connection pool parameters includes one or more of:
    increasing the number of the plurality of connections to the one or more databases;
    decreasing the number of the plurality of connections to the one or more databases; and
    modifying the load balancing data for one or more of the plurality of connections.

6. The computer-implemented method of claim 1, wherein one of the plurality of connections is utilized by two or more of the plurality of cloud-based applications and wherein a connection pool queue is configured to manage a usage of the one of the plurality of connections by each of the two or more of the plurality of cloud-based applications.

7. The computer-implemented method of claim 6, wherein the connection pool queue includes a statement pool queue and a result pool queue.

8. A computer program product having one or more computer readable storage media having computer readable program code collectively stored on the one or more computer readable storage media, the computer readable program code being executed by a processor of a computer system to cause the computer system to perform operations comprising:
    establishing a plurality of connections to one or more databases;
    receiving connection requests from a plurality of cloud-based applications to access a databases of the one or more databases, wherein each connection request includes an address of a server hosting the database of the one or more databases, the name of the database, a username and password to be used to connect to the database, and an identification of a source of the connection request;
    allocating the connection requests to among the plurality of connections, wherein the allocation is determined based at least in part on one or more connection pool parameters;
    monitoring a usage of the plurality of connections by the plurality of cloud-based applications; and updating the one or more connection pool parameters based on an analysis of the usage of the plurality of connections by the plurality of cloud-based applications, wherein the connection pool parameters include a number of the plurality of connections to each of the one or more databases, connection time out settings for each of the plurality of connections to each of the one or more databases, and a connection health threshold configuration for each of the plurality of connections that specifies a maximum number of error or timeouts for a connection to be considered unhealthy, and wherein the plurality of connections to each of the one or more databases are established prior to receiving connection requests for the one or more databases.

9. The computer program product of claim 8, wherein monitoring the usage of the plurality of connections by the plurality of cloud-based applications includes storing connection parameters for the plurality of connections to one or more databases in a connection activity knowledge database.

10. The computer program product of claim 9, wherein monitoring the usage of the plurality of connections by the plurality of cloud-based applications includes storing data regarding the received connection requests from each of the plurality of cloud-based applications in the connection activity knowledge database.

11. The computer program product of claim 8, wherein the connection pool parameters include load balancing data that defines a maximum allocation for each of the plurality of cloud-based applications corresponding to each of the plurality of connections.

12. The computer program product of claim 11, wherein updating includes the one or more connection pool parameters includes one or more of:
 increasing the number of the plurality of connections to the one or more databases;
 decreasing the number of the plurality of connections to the one or more databases; and
 modifying the load balancing data for one or more of the plurality of connections.

13. The computer program product of claim 8, wherein one of the plurality of connections is utilized by two or more of the plurality of cloud-based applications and wherein a connection pool queue is configured to manage a usage of the one of the plurality of connections by each of the two or more of the plurality of cloud-based applications.

14. A computing system comprising:
 a processor;
 a memory coupled to the processor; and
 one or more computer readable storage media coupled to the processor, the one or more computer readable storage media collectively containing instructions that are executed by the processor via the memory to cause the processor to perform operations comprising:
  establishing a plurality of connections to one or more databases;
  receiving connection requests from a plurality of cloud-based applications to access a database of the one or more databases, wherein each connection request includes an address of a server hosting the database of the one or more databases, the name of the database, a username and password to be used to connect to the database, and an identification of a source of the connection request;
  allocating the connection requests to among the plurality of connections, wherein the allocation is determined based at least in part on one or more connection pool parameters;
  monitoring a usage of the plurality of connections by the plurality of cloud-based applications; and
  updating the one or more connection pool parameters based on an analysis of the usage of the plurality of connections by the plurality of cloud-based applications,
 wherein the connection pool parameters include a number of the plurality of connections to each of the one or more databases, connection time out settings for each of the plurality of connections to each of the one or more databases, and a connection health threshold configuration for each of the plurality of connections that specifies a maximum number of error or timeouts for a connection to be considered unhealthy, and
 wherein the plurality of connections to each of the one or more databases are established prior to receiving connection requests for the one or more databases.

15. The computing system of claim 14, wherein monitoring the usage of the plurality of connections by the plurality of cloud-based applications includes storing connection parameters for the plurality of connections to one or more databases in a connection activity knowledge database.

16. The computing system of claim 15, wherein monitoring the usage of the plurality of connections by the plurality of cloud-based applications includes storing data regarding the received connection requests from each of the plurality of cloud-based applications in the connection activity knowledge database.

17. The computing system of claim 14, wherein the connection pool parameters include load balancing data that defines a maximum allocation for each of the plurality of cloud-based applications corresponding to each of the plurality of connections.

* * * * *